United States Patent
Hog

(10) Patent No.: US 6,331,819 B1
(45) Date of Patent: Dec. 18, 2001

(54) DEVICE AND METHOD FOR OPERATING A RAIN DETECTOR

(75) Inventor: Norbert Hog, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/463,934

(22) PCT Filed: Aug. 27, 1998

(86) PCT No.: PCT/DE98/02511

§ 371 Date: Feb. 2, 2000

§ 102(e) Date: Feb. 2, 2000

(87) PCT Pub. No.: WO99/14087

PCT Pub. Date: Mar. 25, 1999

(30) Foreign Application Priority Data

Sep. 13, 1997 (DE) ............................................. 197 40 364

(51) Int. Cl.⁷ ................................................. G08B 21/00
(52) U.S. Cl. .................... 340/604; 340/602; 340/606; 340/619
(58) Field of Search .................. 340/604, 619, 340/602, 601, 603

(56) References Cited

U.S. PATENT DOCUMENTS

| | | | |
|---|---|---|---|
| 4,317,073 | * | 2/1982 | Blaszkowski ........................ 318/483 |
| 4,859,867 | * | 8/1989 | Larson et al. ....................... 307/10.1 |
| 5,059,877 | * | 10/1991 | Teder ................................... 318/444 |
| 5,113,131 | * | 5/1992 | Cooper et al. .......................... 324/96 |
| 5,262,640 | * | 11/1993 | Purvis et al. ..................... 250/227.25 |
| 5,508,595 | * | 4/1996 | Schaefer .............................. 318/444 |
| 5,847,826 | * | 12/1998 | Fukui et al. ......................... 356/335 |
| 5,973,775 | * | 10/1999 | Blitzke ................................ 356/229 |
| 6,040,669 | * | 3/2000 | Hog ..................................... 318/480 |

* cited by examiner

Primary Examiner—Benjamin C. Lee
Assistant Examiner—Son Tang
(74) Attorney, Agent, or Firm—Michael J. Striker

(57) ABSTRACT

An apparatus and a method for operating an optoelectronic rain sensor for detecting the wetting of a window (14) with moisture for wetting-dependent triggering of a system, in particular a windshield wiper system for motor vehicles, is proposed in which the component of the ambient beam (18) of the sensor signal (22) in a first interval is virtually eliminated and therefore need no longer be taken into account in the ensuing detection of the sensor signal (22) in a second interval relevant to triggering of the windshield wiper system. The apparatus includes first means (26, 40, 42), which in the first interval detect the sensor signal (22) and ascertain an interfering light signal (44) corresponding to the ambient beam (18), the latter signal being delivered to a regulator (50), which as a function of the interfering light signal (44) regulates compensation means (30) disposed in the current circuit of the receiver (16), and second means (26, 60, 62), which in the second interval, directly following the first, detect the sensor signal (22) and ascertain a useful light signal (64) corresponding substantially to the transmitter beam (12).

11 Claims, 1 Drawing Sheet

DEVICE AND METHOD FOR OPERATING A RAIN DETECTOR

BACKGROUND OF THE INVENTION

The invention is based on an apparatus for operating an optical rain sensor.

From European Patent Disclosure EP 0 460 180 B1, an apparatus for triggering a wiper system as a function of moisture on a window is already known that has an opto-electronic rain sensor whose sensor signal, on the one hand, has one component based on the presence of moisture on the window (useful light component) and one component based on the ambient light reaching the rain sensor (interfering light component), and on the other includes only a component based on the ambient light (interfering light component). In a first interval, the sensor signal composed of the useful light component and the interfering light component is sampled by first means. Second means sample the sensor signal in a second interval, in which only the interfering light component based on the ambient light is present. The first and second means are sample and hold elements, for example. The signals sampled during the first and second intervals, respectively, are subtracted linearly from one another in a differential amplifier, so that an output signal is obtained that corresponds to the useful light component of the sensor signal. The first and second intervals are assumed to be close together in time. The length of the first interval for detecting the wetting of the window is on the order of magnitude of microseconds, while the second interval for detecting the ambient light is on the order of magnitude of milliseconds.

A disadvantage here is that two signals each have to be processed. This is attained at the cost of resolution of the useful light component. This will now be explained, taking as an example the evaluation of the sensor signal with a microcontroller, but it is also relevant to an analog subtractor: In rain sensors, under certain prerequisites regarding the ambient light, such as the sun going down, it is known that the interfering light component of the sensor signal can far exceed the useful light component. As an example, the interfering light component can be greater than the useful light component by a factor of 10. For an eight-bit microcontroller under such light conditions with maximum amplification of the sensor signal, only about 25 bits are available for the useful light component. In principle, the minimum detectable change in the sensor signal is one bit, and in this case therefore corresponds to a detectable relative change in the useful light signal of four percent. Vehicle manufacturers, however, require that relative signal changes of less than one percent be detected; that is, the signal dynamics of the rain sensor should be better than one percent, so that wiper operation can be attained that is attuned to the wetting of the window and that meets the wishes of the vehicle driver.

Another disadvantage is that the useful light component of the sensor signal can be evaluated, for the sake of triggering a windshield wiper, only at isolated times after the two intervals have elapsed. Dynamic evaluation or continuous evaluation of the useful light signal in real time during the longer first interval is accordingly impossible.

From German Patent Disclosure DE 42 17 390 A1, an apparatus for controlling a windshield wiper system is also known that has an optoelectronic rain sensor that decouples the ambient light component from the sensor signal by modulating the transmitter with a frequency in the range of greater than two kHz. The detected sensor signal, in the form of an alternating signal with a direct current component generated by the ambient light is separated by means of a known circuit, such as a phase-selective rectifier, into the useful light component and the interfering light component.

Other interfering factors of the ambient light, which arise for instance from the nonlinear characteristic curve of the radiation receiver of the rain sensor and cause a nonlinearity of the useful light signal under different ambient light conditions, are also precluded. To that end, the voltage dropping at a working resistor of the radiation receiver is detected and processed in a first operational amplifier to a correction variable, which is delivered to a second operational amplifier along with the useful light signal. The second operational amplifier eliminates the changes in the sensor signal caused by the ambient light by inputting the correction variable and outputs a useful light signal that has been linearized by the correction variable, and the useful light signal is delivered to a control stage for triggering a windshield wiper system of a motor vehicle.

A disadvantage here is that only the nonlinearity of the sensor signal caused by the radiation receiver is precluded. The nonlinear characteristic curve of the amplifier that is also present is not taken into account.

Another disadvantage is that the sensor signal is not linearized directly on being generated in the rain sensor but instead is linearized only after its further processing in a current to voltage converter, in the phase-selective rectifier, and in the amplifier, so that the sensor signal is amplified including the extraneous light component. This in turn contributes to worsening of the resolution of the useful light component of the sensor signal, as described above.

SUMMARY OF THE INVENTION

The apparatus of the invention is designed to eliminate the disadvantages of the prior art. It has the advantage that in a first interval, an optical receiver in the rain sensor detects only the ambient radiation, and an interfering light signal corresponding to this ambient radiation is ascertained, so that a regulator, as a function of the interfering light signal, regulates compensation means for compensating for the ambient light in the current circuit of the receiver, so that in a second interval, immediately following the first, in which the receiver detects the transmitter radiation and ambient radiation, a useful light signal that substantially corresponds only to the transmitter radiation is ascertained directly.

It is advantageous here that the influence of the ambient radiation on the triggering of a windshield wiper system is virtually eliminated in the first interval; that is, it is compensated for by the regulator in a closed-loop control circuit and therefore in the chronologically successive detection of the sensor signal (that is, still before the first amplification of this signal, such as preamplification with a fixed amplification factor), is not detected in the second interval that is relevant to triggering a system, in particular a windshield wiper system, and therefore need no longer be taken into account in an evaluation circuit for triggering this system.

From this, the further advantage is obtained that the input of the amplifier device cannot be overloaded by ambient radiation, since when the amplification factor is set, taking into account the maximum detectable transmitter radiation in the first interval, the ambient radiation is compensated for, and in the second interval the ambient radiation is eliminated, and the maximum transmitter radiation is barely less than what would overload the input.

As a result, the operating point of the input circuit, which essentially has the receiver and the first amplifier device, is independent during the second interval from the interfering light component and is therefore constant. Any change in the interfering light component would otherwise, given a non-linear characteristic curve, lead to a change in the detected useful light component even though the useful light component was actually constant, and thus would make the detection of the useful light incorrect. This could possibly cause tripping of the wipers at the wrong time. The influence of the ambient radiation on the operating point is eliminated by the apparatus of the invention.

Any shift in the operating point caused by the useful light component is not critical, since changes in the useful light component caused by rain drops falling on the window, for instance, are typically greater than the changes in the useful light signal that are caused by the shift in the operating point.

If the operating point of the apparatus is adjusted in a further amplifier, which is disposed in the evaluation circuit, then this adjustment of the operating point again takes place independently of the interfering light component.

Another advantage resides in the closed-loop control circuit, which continuously compensates for the interfering light component of the sensor signal, that is, in real time during the first interval and which thus reacts directly and quickly to changes in the ambient radiation, so that wiper operation of the windshield wiper is not tripped undesirably, for instance when driving through tunnels.

Another advantage is that if a microcontroller is used in an evaluation assembly for evaluating the useful light signal in the second interval, there is no need to blank out the interfering light component, and a less-powerful microcontroller power can be used, which has cost advantages.

A further advantage is that during the second interval, the useful light signal can be evaluated continuously and isochronously, that is, in real time, in the evaluation assembly.

Advantageous further refinements of and improvements to the characteristics recited in the main claim are obtained by the provisions recited in the dependent claims. It is especially advantageous that the regulator regulates the interfering light signal down to a low desired value, which in particular assumes the value of 0. This minimizes the ambient light component in the second interval.

Two possible designs of the exemplary embodiment with respect to the amplifier device for the sensor signal and the compensation means that are disposed in the current circuit of the receiver are especially advantageous. If the compensation means are in the form of a controlled current source, which picks up the interference current generated by the ambient radiation and thus prevents the interfering current from influencing the amplifier device, then the amplifier device has a current-controlled input.

However, if the compensation means are in the form of a regulatable resistor, at which the interfering voltage to be measured, which is generated by the interfering current and is to be delivered to the amplifier device, drops then the amplifier device has a voltage-controlled input. If the ambient light component is increasing, that is, if there is an increasing interference current and an increasing interference voltage, then the resistance is conversely reduced proportionally. The resistor can be realized in the form of a controllable MOSFET, for example.

First and second means are also provided for generating an interfering light signal and a useful light signal, respectively, and are embodied as sample and hold elements, for example. This has the particular advantage that second means furnish the evaluation assembly with a continuous signal for evaluation in the first interval as well.

A further advantage is considered to be that the apparatus of the invention can easily be constructed on the basis of an integrated circuit (ASIC).

BRIEF DESCRIPTION OF THE DRAWING

One exemplary embodiment of the invention is shown in the drawing and described in further detail in the ensuing description.

DESCRIPTION OF THE PREFERRED EMBODIMENT

Figure 1:
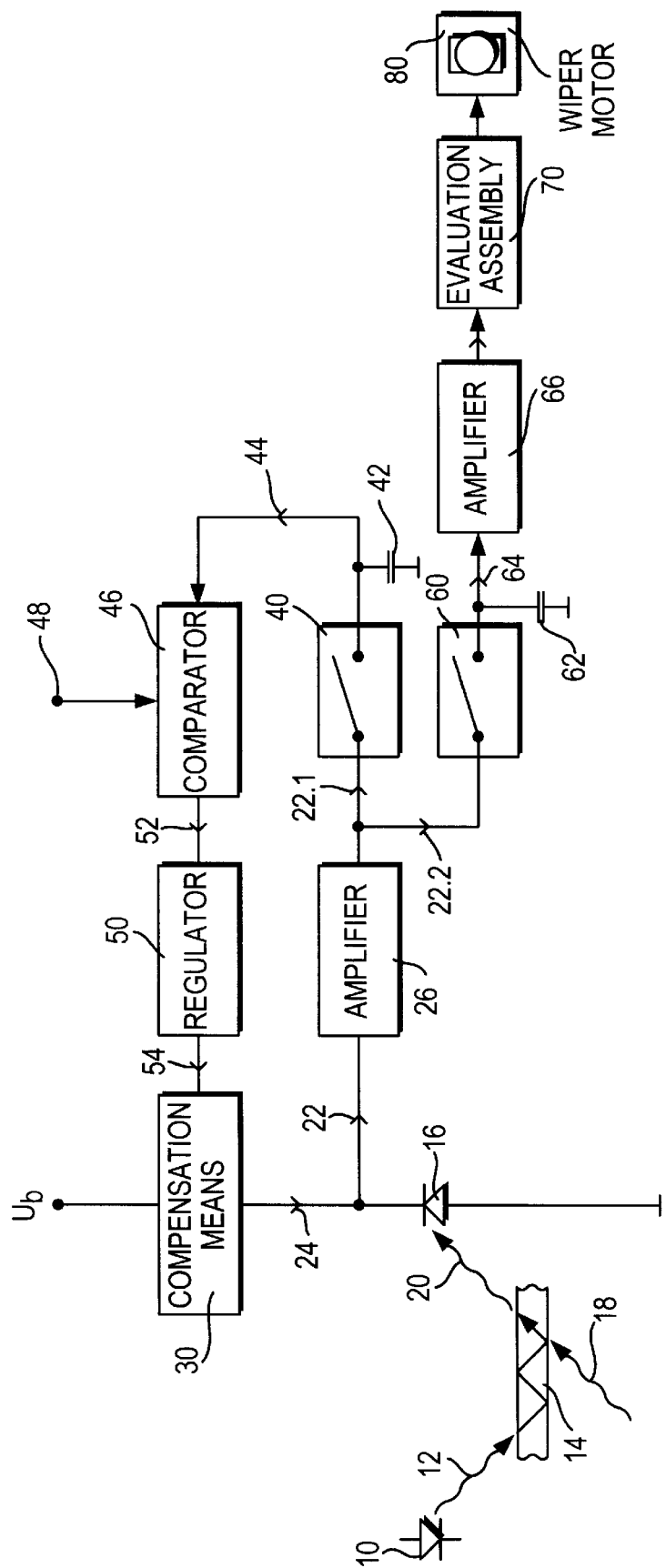
FIG. 1 is a schematic block circuit diagram of the apparatus of the invention in accordance with the exemplary embodiment.

FIG. 1 shows a block circuit diagram of the apparatus of the invention. An optoelectronic rain sensor is shown, whose transmitter 10 feeds transmitter radiation 12 into a window 14. This window 14 is for example a front window of a vehicle that is wiped by a windshield wiper, not shown, and in whose wiping field the rain sensor is disposed. The transmitter radiation, or beam, 12 is directed in the window 14 to a region in which radiation 20 is coupled out and carried to a receiver 16 of the rain sensor. Along with the component of the transmitter radiation 12, the out-coupled radiation, or beam, 20 includes a component of an ambient beam 18, which originates for instance in sunlight or other light sources outside or inside the motor vehicle.

The receiver 16 is by way of example a luminous diode (LRD or LED), which generates a receiver current 24 as a function of the detected radiation 20.

The receiver 16 is connected on the one hand to ground and on the other, via compensation means 30, to the battery voltage Ub or on-board electrical system voltage of the motor vehicle. Thus the compensation means 30 are disposed in the current circuit of the receiver and for instance have a controlled current source or a regulatable resistor, in particular a controllable MOSFET.

A sensor signal 22 of the rain sensor is picked up between the receiver 16 and the compensation means 30. This sensor signal 22 can be either a voltage or a current signal, which is carried to an amplifier device 26 with a voltage- or current-controlled input.

The amplifier device 26 includes at least one preamplifier, which amplifies the sensor signal 22 by a constant factor. The sensor signal 22.1, 22.2 amplified in this amplifier device 26 is delivered in alternation to a closed-loop control circuit for regulating the compensation means 30 or to an evaluation circuit for evaluating the sensor signal 22.2 with regard to wiper operation.

The closed-loop control circuit has a first switch 40. If the first switch 40 is closed, then the sensor signal 22.1 charges a first capacitor 42. The voltage picked up at the capacitor corresponds to an interfering light signal 44 and is carried on as an actual value or controlled variable of the closed-loop control circuit to a comparator 46. Via a second input, a desired value 48 is specified to the comparator 46 as a guide variable. The differential signal 52 ascertained in the comparator 46 is delivered as a standard deviation to a regulator 50, which as a function of the differential signal 52 outputs a controlling variable 54 to the compensation means 30.

Analogously to the closed-loop control circuit, the evaluation circuit has a second switch 60 and a second capacitor 62. The useful light signal 64 ascertained in them is delivered via a further amplifier 66 to an evaluation assembly 70, which in turn evaluates the useful light signal 64 with a view to triggering a wiper motor 80.

Below, first and second means are introduced that encompass among others the function of sample and hold elements and that essentially include the first switch 40 and the first capacitor 42, and the second switch 60 and the second capacitor 62, respectively, and preferably the amplifier device 26 for each as well.

The evaluation assembly 70 is typically embodied by a microcontroller, but it can also include an analog circuit.

The mode of operation of the apparatus of the invention shown in FIG. 1 will now be described in further detail. The sensor signal 22 now is a voltage signal which is applied to a voltage-controlled input of the amplifier device 26, and the compensation means 30 are embodied by a controllable MOSFET.

By means of the transmitter beam 12 of the rain sensor, the wetting of the window 14 with moisture or water is detected by the component that reaches the receiver 16. This component of the full radiation 20 detected by the receiver 16 is therefore called the useful light component. However, because of the functional principle of the optoelectronic rain sensor, ambient radiation 18 can also get from outside into the window 14 and from there can reach the receiver 16. This ambient radiation, or beam, 18 is superimposed on the transmitter beam 12 and therefore interferes with the detection of the wetting of the window 14, so that the component of the radiation 20 that originates in the ambient beam 18 will hereinafter be designated the interfering light component.

In the input circuit of the circuit, that is, the receiver 16 and the amplifier device 26, it is possible with the apparatus of the invention to detect the useful light component without the interfering light component of the radiation 20. To that end, the transmitter 10 is operated in clocked fashion, so that it is off in a first interval and is on in a second interval. Synchronously to this, the switches 40, 60 are also switched. The length of each interval ranges on the order of magnitude of milliseconds and is for instance 5 milliseconds for the first interval and one millisecond for the second interval.

During the first interval, the following now happens: The radiation 20 detected by the receiver 16 now includes only one component, originating in the ambient beam 18. As a function of the intensity of the radiation 20, the receiver 16 generates a current 24. The receiver current 24 causes a voltage drop at the resistor of the MOSFET 30, and this drop is amplified as a sensor signal 22 in the amplifier device 26.

During the first interval, the first switch 40 is closed and the second switch 60 is opened, so that the amplified sensor signal 22.1 charges the first capacitor 42. The first means 40, 42 consequently generate an interfering light signal 44, which reproduces only the ambient beam 18 detected by the receiver 16. Theoretically, the desired value 48 specified in the comparator 46 is assigned a value of zero. However, since this is difficult to achieve in actuality, a desired value 48 of virtually 0 is specified. The interfering light signal 44 is typically greater than 0. In a known way, the comparator 46 of the closed-loop control circuit forms the difference between the desired value 48 and the interfering light signal 44, so that the regulator 50 regulates the resistance of the MOSFET 30 during the interval in such a way, in particular reducing it, that the sensor signal 22 decreases, and in the process the capacitor 42 is discharged via the sensor signal 22.1, until consequently the interfering light signal 44 becomes virtually 0.

The resistance of the MOSFET 30, which is regulated in the first interval, is now maintained in the second interval.

During the second interval, the first switch 40 is opened and the second switch 60 is closed. Thus the closed-loop control circuit is switched off, and no further regulation of the compensation means 30 takes place during the second interval. Since during the second interval now, in addition to the ambient beam 18, the component of the transmitter beam 12 that varies with the moisture on the window is also detected by the receiver 16, but the compensation means 30 compensate for the ambient beam 18 on the sensor signal 22, the sensor signal 22 includes only the useful light component, originating from transmitter beam 12, in the radiation 20. Analogously to the first means 40, 42 of the closed-loop control circuit, the sensor signal 22 is processed in the evaluation circuit by second means 60, 62 to form a useful light signal 64. The useful light signal 64 is then amplified and the further amplifier 66, in which an operating point can for instance can also be adjusted, and is evaluated in the evaluation assembly 70, for instance being compared with turn-on and turn-off thresholds stored in memory there, so that if one of these thresholds is exceed or undershot, wiper operation, such as continuous wiper operation, is turned on or off.

As a result, the first and second intervals cannot be transposed chronologically, because the transmitter 10 is first turned on and then after that is turned off.

In a preferred version, the ON times of the transmitter 10 are short, being on the order of magnitude of one millisecond, for instance. In this case, during the short second interval, the second capacitor 62 is charged by the sample and hold element in the form of the second means 60, 62 via the sensor signals 22.2, and the useful light signal 64 is ascertained, which is then buffer-stored in the subsequently opened second switch 60 in the capacitor 62, and is processed in the evaluation assembly 70. The next time the second switch 60 closes, the capacitor 62 can be charged or discharged via the sensor signal 22.2.

This has the advantage that the transmitter 10, which is typically embodied as a light-emitting diode (LED), is supplied with current only briefly, and therefore only a relatively slight power loss drops at the transmitter 10.

If the second interval lasts longer, then continuous values of the useful light signal 64 can be ascertained at the second capacitor 62 and evaluated by the evaluation assembly 70, since the second capacitor 62, with the second switch 60 closed, is charged and discharged again via the sensor signal 22.2 during the second interval. A dynamic evaluation can consequently be achieved in this way.

The actual interval lengths that are realized, however, depend on the demands made of the apparatus according to the invention in an individual case.

As mentioned at the outset, the compensation means 30, as an alternative to the version described above, include a current source, controlled by the regulator 50, which picks up the current 24 generated by the ambient beam 18 and thus compensates for it. In this case, the sensor signal 22 is a current signal, which is delivered to a current controlled input of the amplifier device 26. This does not change anything in the above-described mode of operation of the apparatus of the invention.

In an equivalent version of the exemplary embodiment, the receiver 16 and the compensation means 30 are disposed in reverse order in the receiver current circuit, so that the compensation means 30 are polarized not toward battery voltage Ub, or the positive pole, but rather toward ground. A regulatable resistor or a controllable current sink can for instance be used as the compensation means 30.

What is claimed is:

1. An apparatus for operating a rain sensor for detecting a wetting of a window with moisture for wetting-dependent triggering of a windshield wiper system for motor vehicles, the apparatus comprising a transmitter which outputs a transmitter beam into a window at a first point; a receiver which detects a beam outcoupled from the window at a second point and as a function of a radiation intensity detected outputs a sensor signal; an amplifier device which receives said sensor signal and has a downstream evaluation assembly that triggers the system, with the beam having a transmitter beam component as a function of moisture on the window and/or an ambient beam component; first means which in a first interval for detecting the ambient beam component with said transmitter switched off detect the sensor signal amplified in said amplifier device and from this signal ascertain an interfering light signal corresponding to the ambient beam; a regulator to which the later signal is delivered and which drives a compensation means disposed in a current circuit of said receiver to regulate the interfering light signal to a desired value; and second means which in a second interval directly following the first interval, responsive to the transmitter beam component and the ambient beam with said transmitter switched on, to detect the amplified sensor signal which is influenced by said compensation means and from which the amplified sensor signal ascertains a useful light signal corresponding substantially to a beam of said transmitter.

2. An apparatus as defined in claim 1, wherein said regulator is formed to regulate the interfering light signal to a desired value which has a low level of zero volts.

3. An apparatus as defined in claim 1, wherein said amplifier device has a current-controlled input, said compensation means including a controlled current source.

4. An apparatus as defined in claim 1, wherein said amplifier device has a controlled current sink.

5. An apparatus as defined in claim 1, wherein said amplifier device has a current-control input, said compensation means including a regulatable resistance in form of a controllable MOSFET.

6. An apparatus as defined in claim 1, wherein said first means and said second means include sample and hold elements.

7. An apparatus as defined in claim 1, wherein said first means is formed so as to furnish said regulator with a continuous signal over said first interval.

8. An apparatus as defined in claim 1, wherein said second means is formed so as to furnish said evaluation assembly with a continuous signal for evaluation over said second interval.

9. An apparatus as defined in claim 7, wherein said second means is formed so as to furnish said evaluation assembly with a continuous signal for evaluation over said second interval.

10. An apparatus as defined in claim 1, wherein said first and second means are formed so that a duration of said first and second interval is 5 milliseconds and 1 millisecond respectively.

11. A method of operating a rain sensor for detecting a wetting of a window with moisture for wetting-dependent triggering of a windshield wiper system for motor vehicles, comprising the steps of outputting a transmitter beam by a transmitter into the window at a first point; detecting a beam out coupled from the window at a second point by a receiver; as a function of a radiation intensity detected, outputting a sensor signal to an amplifier device and to a downstream evaluation assembly; providing a beam with a transmitter beam component as a function of moisture of the window, and an ambient beam component; in a first interval for detecting the ambient beam with the transmitter switched off, amplifying the sensor signal in the amplifier device and delivering the amplified sensor signal to first means; ascertaining by the first means an interfering light signal corresponding to the ambient beam; regulating said interfering signal to a desired value by means of a regulator responsive to the first means to a drive a compensation means disposed in a current circuit of the receiver; and in a second interval directly following the first interval for detecting the transmitter beam and the ambient beam with the transmitter switched on, delivering the amplified sensor signal to said second means by which from the amplified sensor signal a useful light signal corresponding substantially to the transmitter beam is ascertained.

* * * * *